United States Patent
Prokup et al.

(10) Patent No.: US 9,511,876 B2
(45) Date of Patent: Dec. 6, 2016

(54) ACTUATOR HOUSING FOR RAM AIR TURBINE DEPLOYMENT ACTUATOR

(71) Applicant: HAMILTON SUNDSTRAND CORPORATION, Charlotte, NC (US)

(72) Inventors: Christopher S. Prokup, Carpentersville, IL (US); David G. Bannon, Rockford, IL (US); Mark A. Osborn, Cherry Valley, IL (US); Gregory J. Bradley, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 12 days.

(21) Appl. No.: 14/624,222

(22) Filed: Feb. 17, 2015

(65) Prior Publication Data

US 2016/0236793 A1 Aug. 18, 2016

(51) Int. Cl.
*B64D 41/00* (2006.01)
*F16K 27/00* (2006.01)

(52) U.S. Cl.
CPC .............. *B64D 41/007* (2013.01); *F16K 27/00* (2013.01)

(58) Field of Classification Search
CPC .................. F16K 27/00; B64D 41/007; B64D 2033/0213; B64D 41/00; B64D 2041/002; B64C 29/0075

See application file for complete search history.

(56) References Cited

U.S. PATENT DOCUMENTS

| | | | | |
|---|---|---|---|---|
| 5,398,780 A | * | 3/1995 | Althof | B64D 41/007 185/39 |
| 9,091,321 B2 | * | 7/2015 | Barber | F16F 9/52 |
| 2004/0227123 A1 | * | 11/2004 | Rodgers | F16K 25/005 251/315.04 |
| 2015/0059875 A1 | * | 3/2015 | Loveless | F16K 27/00 137/487.5 |

* cited by examiner

*Primary Examiner* — Brian M O'Hara
(74) *Attorney, Agent, or Firm* — Snell & Wilmer L.L.P.

(57) ABSTRACT

An actuator housing is provided. The actuator housing may comprise a body. A first side of the body may include a first pin interface and a first threaded hole clocked relative to the first pin interface. The first pin interface and the first threaded hole may be configured to interface with a solenoid housing. A second side the body may be disposed adjacent the first side. The second side may include a toggle assembly interface configured to receive a toggle assembly. A third side of the body may be disposed adjacent the first side and the second side. The third side may include an adapter interface configured to receive an adapter for the toggle assembly.

13 Claims, 7 Drawing Sheets

ACTUATOR HOUSING FOR RAM AIR TURBINE DEPLOYMENT ACTUATOR

FIELD OF INVENTION

The present disclosure relates to a ram air turbine (RAT), and, more specifically, to an actuator housing for a RAT.

BACKGROUND

Ram air turbines are generally used in aircraft to provide supplemental and/or emergency power to the aircraft by utilizing air flow to rotate a turbine. Ram air turbines can provide either electrical or hydraulic power. Electrical ram air turbines produce electrical power by transferring the rotational energy of the turbine to a generator. Ram air turbines can be located in a forward section of the aircraft such as the nose, for example. Ram air turbines may also be located in an aft section of the aircraft such as a tail, for example. Ram air turbines may be stowed when not in use and deployed when power is desired. In that regard, ram air turbines may include an actuator to deploy and stow the turbine. The actuators may include integrated hydraulic circuits that are designed to specific sizes. Current deployment actuators may be difficult and/or costly to make to the specified dimensions.

SUMMARY

An actuator housing may comprise a body. A first side of the body may include a first pin interface and a first threaded hole clocked relative to the first pin interface. The first pin interface and the first threaded hole may be configured to interface with a solenoid housing. A second side the body may be disposed adjacent the first side. The second side may include a toggle assembly interface configured to receive a toggle assembly. A third side of the body may be disposed adjacent the first side and the second side. The third side may include an adapter interface configured to receive an adapter for the toggle assembly.

In various embodiments, the first pin interface may comprise a pin hole and a pin protruding from the pin hole. The pin may be configured to bottom in the pin hole. The pin may be diamond dowel. The first threaded hole may have a helical insert. The toggle assembly may include a plurality of second threaded holes, an interface hole between the second threaded holes, and a second pin interface. The adapter interface may also comprise a plurality of second threaded holes, a plurality of second pin interfaces, and an interface hole between the second threaded holes. A mounting appendage may extend away from the body opposite the second side. The mounting appendage may also comprise a bearing.

A ram air turbine may comprise a housing, a strut coupled to the housing, a turbine at a distal end of the strut, and a deployment actuator secured to the strut and the housing. The deployment actuator may comprise an actuator housing with a body. A first side of the body may include a first pin interface and a first threaded hole clocked relative to the first pin interface. The first pin interface and the first threaded hole may be configured to interface with a solenoid housing. A second side the body may be disposed adjacent the first side and include a toggle assembly interface configured to receive a toggle assembly. A third side of the body may be disposed adjacent the first side and the second side. The third side includes an adapter interface configured to receive an adapter for the toggle assembly.

In various embodiments, the first pin interface may comprise a pin hole and a pin protruding from the pin hole. The pin may comprise diamond dowel configured to bottom in the pin hole. The first threaded hole may comprise a helical insert. The toggle assembly may include a plurality of second threaded holes, an interface hole between the second threaded holes, and a second pin interface. The adapter interface may include a plurality of second threaded holes, a plurality of pin interfaces, and an interface hole between the second threaded holes. A mounting appendage may extend away from the body opposite the second side and couple to the housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
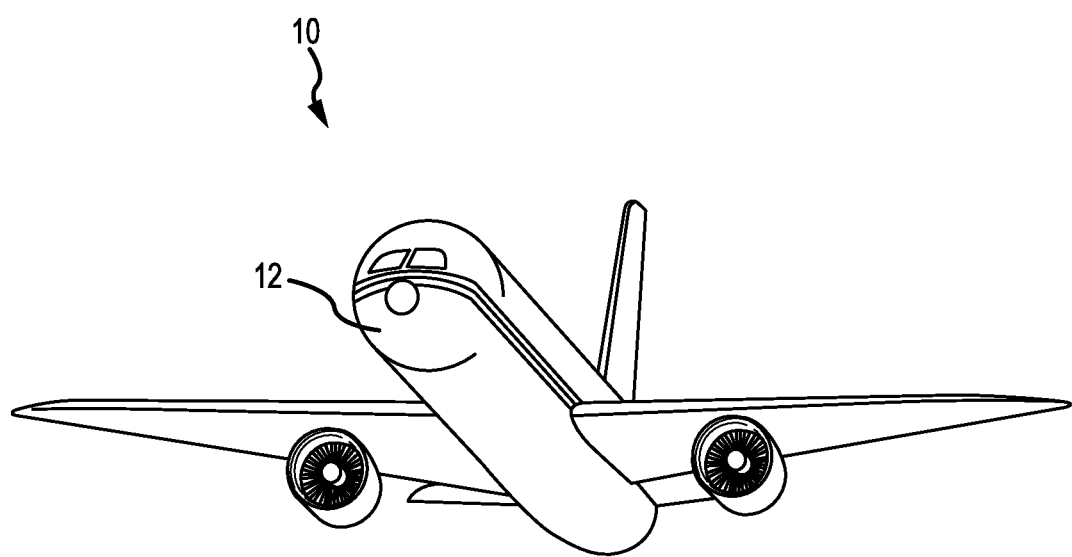
FIG. 1 illustrates a perspective view of an aircraft, in accordance with various embodiments.
Figure 2:
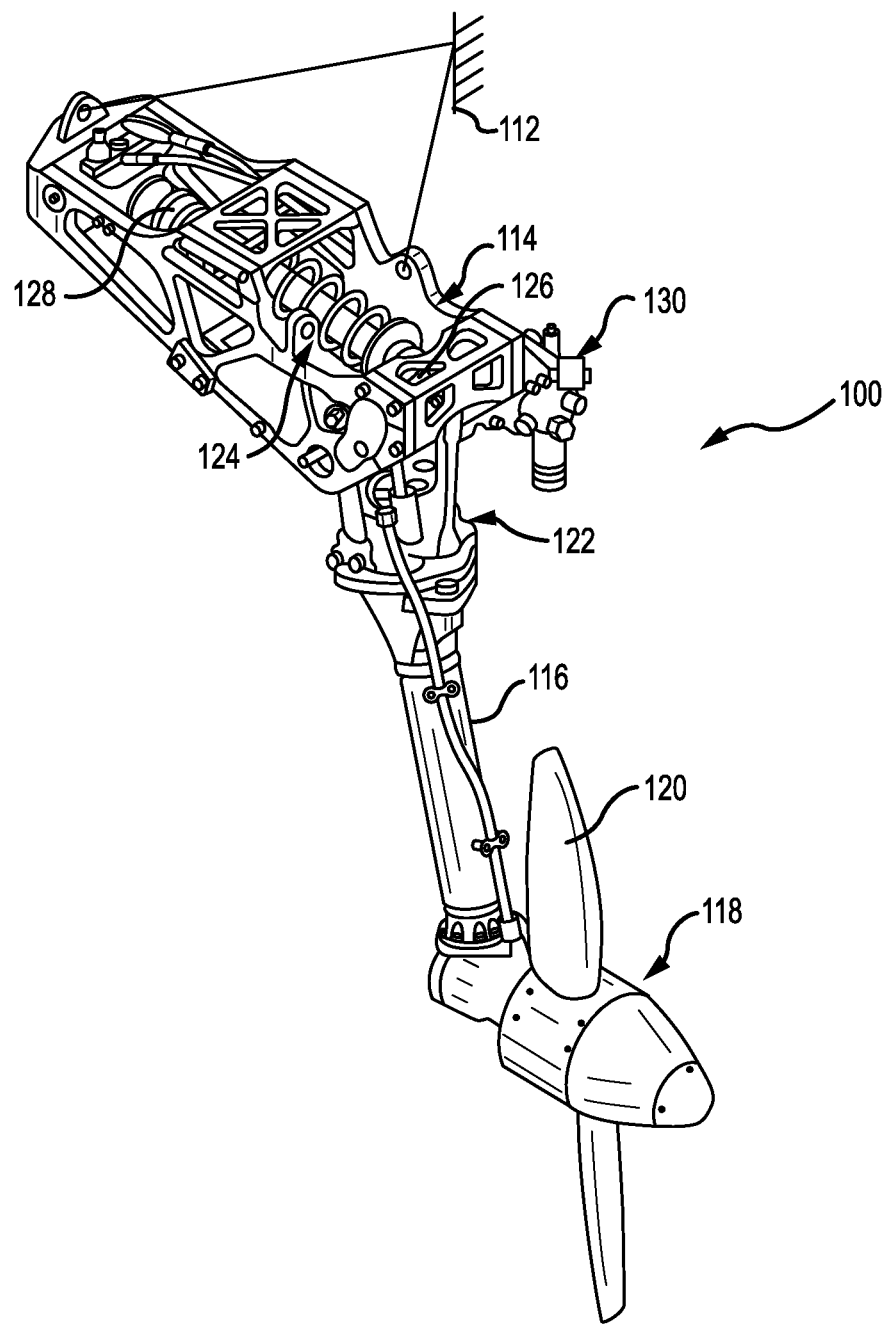
FIG. 2 illustrates a perspective view of a ram air turbine for an aircraft, in accordance with various embodiments.

In various embodiments and with reference to FIGS. 1 and 2, an aircraft 10 may comprise a ram air turbine 100. Ram air turbine 100 (RAT 100) may be lowered out aircraft 10 and into the path of airflow to generate electrical power and/or hydraulic power.

In various embodiments, RAT 100 may be secured to nose 12 of aircraft 10 by housing 114. Housing 114 may support strut 116 with turbine 118 at a distal end of strut 116. Turbine 118 may comprise blades 120 configured to rotate in response to RAT 100 being deployed. Rotation of blades 120 may drive a generator. A deployment actuator 124 may be secured to strut 116 and housing 114. Deployment actuator 124 may provide force to deploy and stow turbine 118.

Figure 3A:
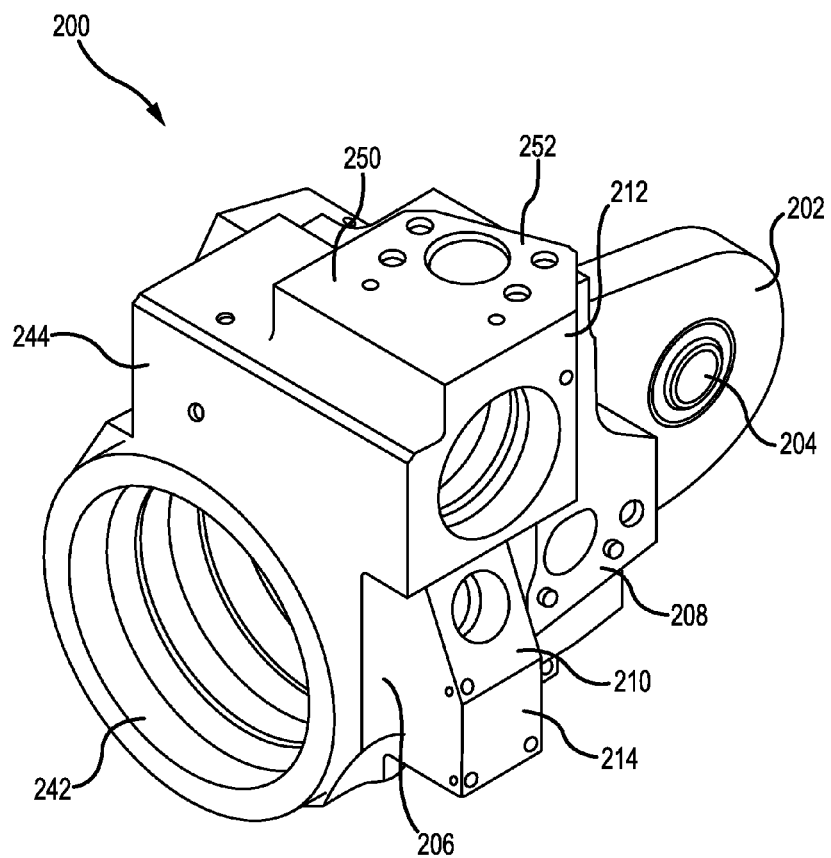
FIG. 3A illustrates a perspective view of an actuator housing, in accordance with various embodiments.

With reference to FIG. 3A, a perspective view of an actuator housing 200 is shown, in accordance with various embodiments. Actuator housing 200 has a mounting appendage 202 with bearing 204 to enable movement of actuator housing 200 when mounted. Mounting appendage 202 extends away from body 206 of actuator housing 200. Body 206 may comprise a polygonal shape with numerous sides. For example, body 206 may comprise six sides with each side approximately orthogonal to adjacent sides. Body 206 of actuator housing 200 includes interfaces for various components related to RAT actuation.

Figure 3B:
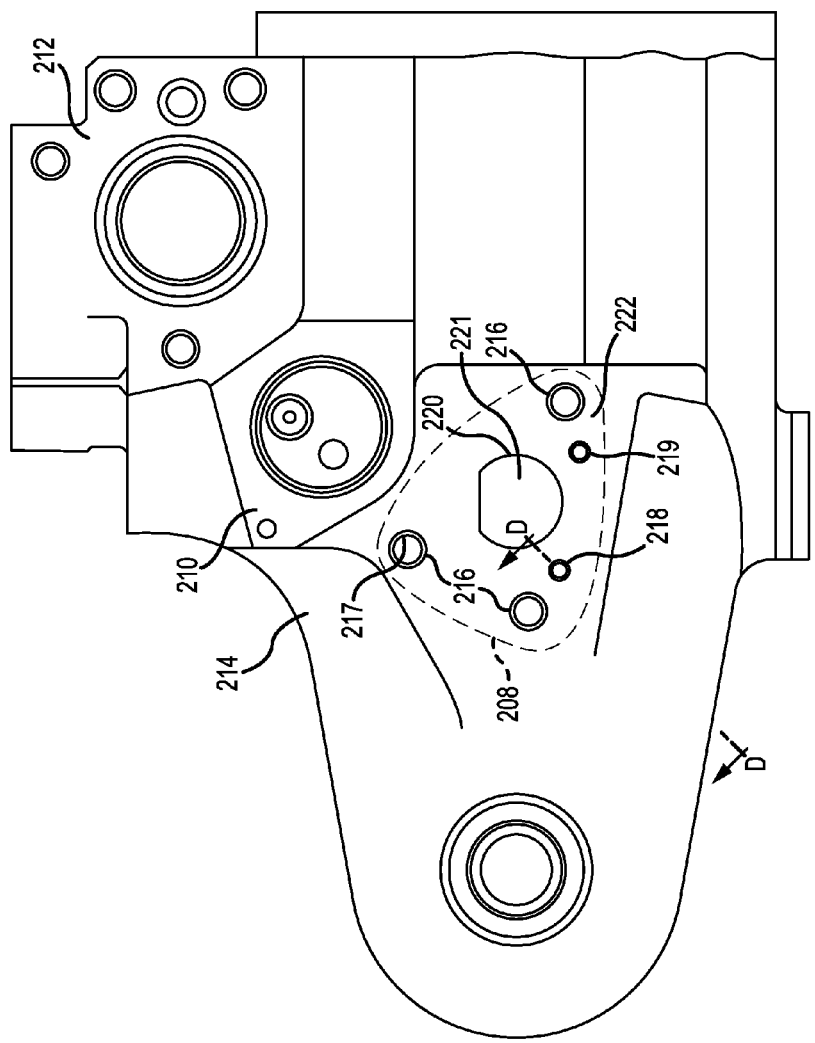
FIG. 3B illustrates an elevation view of a solenoid housing interface in an actuator housing, in accordance with various embodiments.

With reference to FIGS. 3A and 3B, a solenoid housing interface 208 in an actuator housing 200 is shown, in accordance with various embodiments. Solenoid housing interface 208, switch interface 210, and control valve interface 212 may be formed on a side 214 of body 206. Solenoid housing interface 208, switch interface 210, and control valve interface 212 each may comprise an assortment of pin interfaces, threaded holes, and/or component openings to engage components coupled to body 206 of actuator housing 200. Solenoid housing interface 208 may comprise pin interface 219 and pin interface 218. One or more of pin interface 218 and pin interface 219 may comprise a pin hole formed in surface 222 of body 206.

Figure 3C:
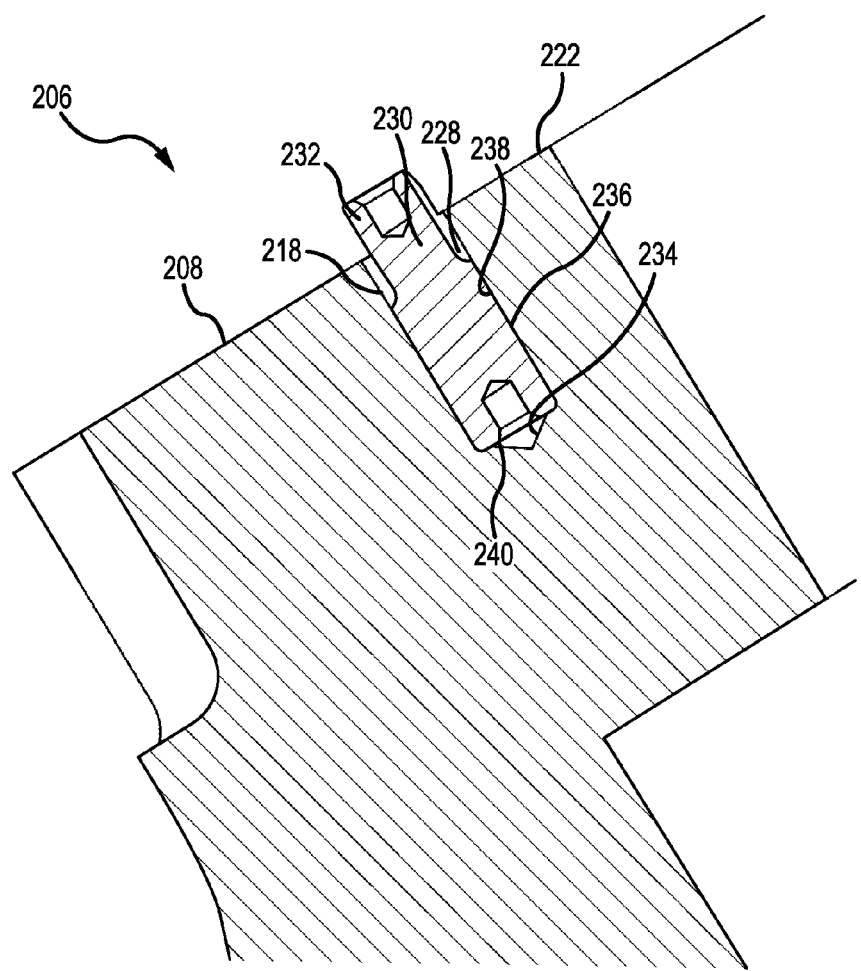
FIG. 3C illustrates a cross-sectional view of an opening and dowel of a solenoid housing interface, in accordance with various embodiments.

With brief reference to FIG. 3C, a cross-sectional view of a pin interface 218 receiving pin 230 of a solenoid housing interface 208 is shown along line D-D of FIG. 3B, in accordance with various embodiments. Pin interface 218 includes pin hole 228 formed in surface 222 of body 206. Pin hole 228 includes a bottom surface 234 limiting the depth of pin hole 228. The depth of pin hole 228 into surface 222 may be selected based on a length of pin 230. In various embodiments, the depth may be configured so that pin hole 228 may accept pin 230 with bottom surface 240 of pin 230 bottoming (i.e., contacting) bottom surface 234 of pin hole 228. Bottom surface 234 of pin hole 228 may have a conical contour with a flat ridge surrounding the conical contour.

In various embodiments, pin body 236 may have a cylindrical contour and be configured to contact sidewalls 238 of pin hole 228 so that pin 230 is press fit into pin hole 228. Head 232 may extend out of pin hole 228 when pin 230 is fully inserted into pin hole 228. Head 232 may have a geometry different than the geometry of pin body 236. Head 232 may have a diamond contour, or rectangular contour, a polygonal contour, and/or any other suitable contour. Head 232 may also have a smaller diameter circular contour than the diameter of the cylindrical geometry of pin body 236. In various embodiments, pin 230 may be diamond dowel. In that regard, pin 230 may press fit in body 206 and have a relatively forgiving fit into the solenoid housing coupled by solenoid housing interface 208.

Returning to FIGS. 3A and 3B, pin interface 219 and pin interface 218 may have similar configurations or may vary as described above. Threaded holes 216 may be formed by making a cylindrical opening in body 206 and inserting a helical coil into the cylindrical opening. Threaded holes 216 may receive threaded fasteners to couple a solenoid housing to actuator housing 200. Interface hole 220 may be defined in surface 222 of body 206 and may have an asymmetrical, D-shaped perimeter. Interface hole 220 includes solenoid housing 221 location where a coupled solenoid housing rests. The relative positions of threaded holes 216, pin interface 218, pin interface 219, and interface hole 220 are clocked (i.e., fixed relative to one another) in order to ensure accurate interface with solenoid housing interface 208 at solenoid housing 221 location. In that regard, threaded holes 216, pin interface 218, pin interface 219, and interface hole 220 may have a consistent position relative to one another but may be placed in a different location relative to other parts of actuator housing 200 such as switch interface 210.

Figure 3D:
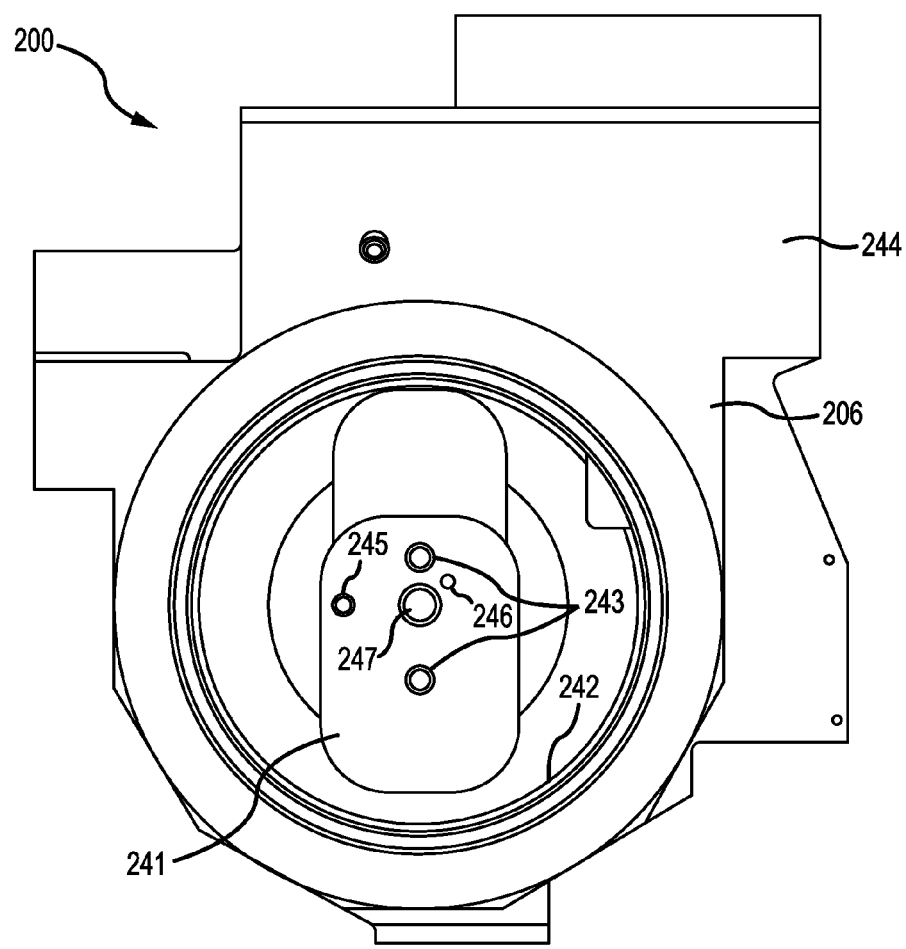
FIG. 3D illustrates a toggle assembly in an actuator housing, in accordance with various embodiment.

With reference to FIG. 3D, a toggle assembly interface 241 is shown in cylindrical member 242 of side 244 of actuator housing 200, in accordance with various embodiment. Toggle assembly interface 241 includes threaded holes 243 disposed on opposite sides of center opening 247 and aligned with center opening 247. Threaded holes may be formed in body 206 as openings containing a helical coil insert. Spring interface 246 is configured to receive a spring tang of a toggle assembly. Pin interface 245 may receive a pin protruding from a toggle assembly to be coupled to body 206 by toggle assembly interface 241. Pin interface 245 may be similar to pin interface 218 (of FIG. 3C). Pin interface 245, threaded holes 243, center opening 247, and spring interface 246 may all be clocked (i.e., fixed relative to one another) in order to ensure accurate interface with a toggle assembly coupled to toggle assembly interface 241.

Figure 3E:
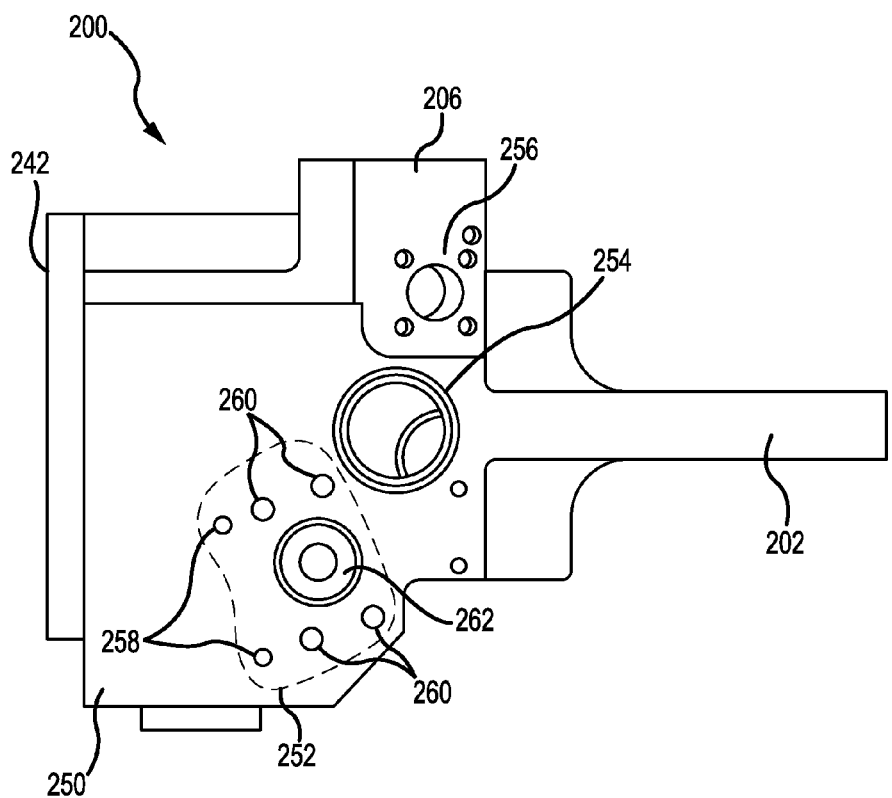
FIG. 3E illustrates an elevation view of an adapter housing interface of an actuator housing, in accordance with various embodiments.

With reference to FIG. 3E, an elevation view of an adapter housing interface 252 is shown on side 250 actuator housing 200, in accordance with various embodiments. Side 250 of actuator housing 200 may be adjacent side 214 (of FIG. 3B) as well as side 244 (of FIG. 3D) and disposed at approximately 90 degrees relative to side 214 and to side 244. Also formed in side 250 are an access opening 254 to enable installation of a toggle assembly (i.e., at toggle assembly interface 241 of FIG. 3D), and a stowed indicator switch interface 256.

In various embodiments, adapter housing interface 252 allows an adapter assembly coupled to adapter housing interface 252 to interact with a toggle assembly coupled to toggle assembly interface 241 (of FIG. 3D). Mounting appendage 202 may be disposed at an opposite end of body 206 from cylindrical member 242. Adapter housing interface 252 comprises pin interfaces 258. Pin interfaces 258 may be similar to pin interface 218 (of FIG. 3C). Adapter housing interface 252 may also comprise threaded holes 260. Threaded holes 260 may be made by forming a hole in side 250 and inserting a helical coil into the hole. Threaded holes 260 may be clocked relative to pin interfaces 258 (i.e., formed in a fixed position relative to pin interfaces 258. Threaded holes may be disposed around interface hole 262 of adapter housing interface 252. Pin interfaces 258 may be each be roughly aligned with two of threaded holes 260. The clocked interface components ensure a workable fit for coupling an adapter housing to adapter housing interface 252.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A ram air turbine (RAT) having an actuator to deploy and stow the RAT, the actuator having an actuator housing, comprising:
    a body, the body having;
        a first side of the body comprising an interface hole, a first pin interface, and a first threaded hole with the interface hole and the first threaded hole clocked relative to the first pin interface, wherein the first pin interface and the first threaded hole are configured to interface with a solenoid housing, wherein the interface hole has an asymmetric geometry;
        a second side of the body orthogonal to the first side and comprising a toggle assembly interface configured to receive a toggle assembly, wherein the second side of the body comprises a plurality of second threaded holes, an interface hole between the second threaded holes, and a second pin interface, wherein the second threaded holes and the second pin interface are clocked relative to the interface hole;
        a third side of the body orthogonal to the first side and the second side, wherein the third side comprises an adapter interface configured to receive an adapter for the toggle assembly; and
        a mounting appendage extending from the body and configured to retain a bearing.

2. The actuator housing of claim 1, wherein the first pin interface comprises:
    a pin hole; and
    a pin protruding from the pin hole.

3. The actuator housing of claim 2, wherein the pin is configured to bottom in the pin hole.

4. The actuator housing of claim 3, wherein the pin comprises diamond dowel.

5. The actuator housing of claim 1, wherein the first threaded hole comprises a helical insert.

6. The actuator housing of claim 1, wherein the adapter interface comprises:
    a plurality of second threaded holes;
    a plurality of second pin interfaces; and
    an interface hole central to the second threaded holes.

7. A ram air turbine (RAT), comprising:
    a housing;
    a strut coupled to the housing;
    a turbine at a distal end of the strut; and
    a deployment actuator secured to the strut and the housing, the deployment actuator comprising:
    an actuator housing comprising a body,
    a first side of the body comprising a first pin interface and a first threaded hole clocked relative to the first pin interface, wherein the first pin interface and the first threaded hole are configured to interface with a solenoid housing,
    a second side of the body adjacent the first side and comprising a toggle assembly interface configured to receive a toggle assembly, and
    a third side of the body adjacent the first side and the second side, wherein the third side comprises an adapter interface configured to receive an adapter for the toggle assembly.

8. The RAT of claim 7, wherein the first pin interface comprises:
    a pin hole; and
    a pin protruding from the pin hole.

9. The RAT of claim 8, wherein the pin comprises diamond dowel configured to bottom in the pin hole.

10. The RAT of claim 7, wherein the first threaded hole comprises a helical insert.

11. The RAT of claim 7, wherein the toggle assembly comprises:
   a plurality of second threaded holes;
   an interface hole between the second threaded holes; and
   a second pin interface.

12. The RAT of claim 7, wherein the adapter interface comprises:
   a plurality of second threaded holes;
   a plurality of pin interfaces; and
   an interface hole between the second threaded holes.

13. The RAT of claim 7, further comprising a mounting appendage extending away from the body opposite the second side, wherein the mounting appendage is coupled to the housing.

* * * * *